United States Patent [19]
Afian et al.

[11] Patent Number: 4,682,841
[45] Date of Patent: Jul. 28, 1987

[54] LIGHT RADIATION CONCENTRATOR AND METHOD OF MAKING THE SAME

[76] Inventors: Viktor V. Afian, ulitsa Sevaka, 2, kv. 13; Albert V. Vartanian, ulitsa Aigestana, 2, kv. 57; Ruben G. Martirosian, ulitsa Shinararneri, 27, kv. 32, all of Erevan; Dmitry S. Strebkov, Kirovogradsky proezd, 3, korpus 1, kv. 17; Stanislav V. Ryabikov, pereulok Vasnetsova, 12, kv. 64, both of Moscow, all of U.S.S.R.

[21] Appl. No.: 273,389

[22] Filed: Jun. 15, 1981

[51] Int. Cl.[4] ............ G02B 5/32; G03H 1/02; F24J 2/02
[52] U.S. Cl. .................................. 350/3.7; 126/451
[58] Field of Search ............ 350/3.7, 3.72, 3.73, 350/162.16, 3.81, 3.69; 126/440, 451

[56] References Cited

U.S. PATENT DOCUMENTS

| | | | |
|---|---|---|---|
| 3,807,829 | 4/1974 | Close | 350/3.72 |
| 3,909,111 | 9/1975 | Meyerhofer | 350/3.81 |
| 3,941,450 | 3/1976 | Spitz et al. | 350/3.73 |
| 4,204,881 | 5/1980 | McGrew | 350/3.73 |
| 4,238,246 | 12/1980 | Genequand et al. | 126/440 |
| 4,253,723 | 3/1981 | Kojima et al. | 350/3.72 |

OTHER PUBLICATIONS

Sincerbox, "Formation of Optical Elements by Holography" IBM Tech. Disc. Bull., vol. 10, No. 3, Aug. 1967, pp. 2-3.
Leith et al., "White Light Hologram Technique" Applied Optics, vol. 17, No. 20, pp. 3187-3188.
"Optical Holography" by R. J. Collier, C. B. Burchkhardt, L. H. Lin, Academic Press, New York—London (1971).
"Coll. High-Temperature Solar-Energy Furnaces," M., Insotrannay Literatura Publ. House, 1960, pp. 210-216.

*Primary Examiner*—Bruce Y. Arnold
*Attorney, Agent, or Firm*—Lilling & Greenspan

[57] ABSTRACT

A light radiation concentrator comprises a frame and at least two radiation concentrating facets secured therein, the facets being made in the form of holograms. The structure of the diffraction gratings of the holograms is such that the concentrating facets have a common focal spot.

A method of making a light radiation concentrator consists in using light-sensitive objects, the number of which is equal to the number of the concentrating facets. The light-sensitive objects are secured in the concentrator frame and an interference pattern produced by a collimated reference radiation beam and an object radiation beam diverging from the focal spot is recorded in a sequence on each of the light-sensitive objects. The recording is effected by causing the collimated reference beam to move in parallel with itself and by directing the object beam from the focal spot to the respective light-sensitive object.

5 Claims, 2 Drawing Figures

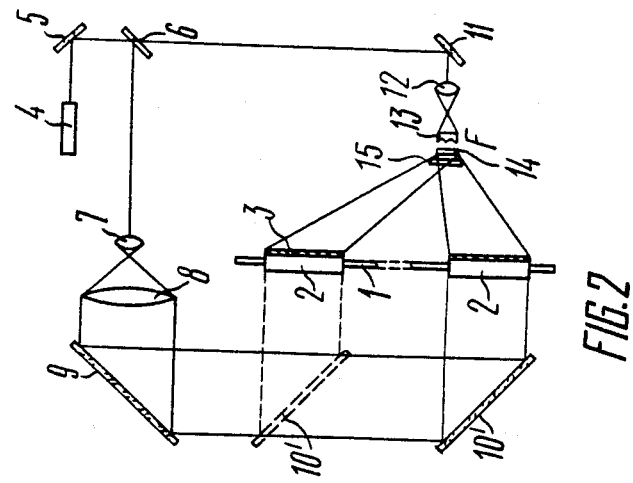
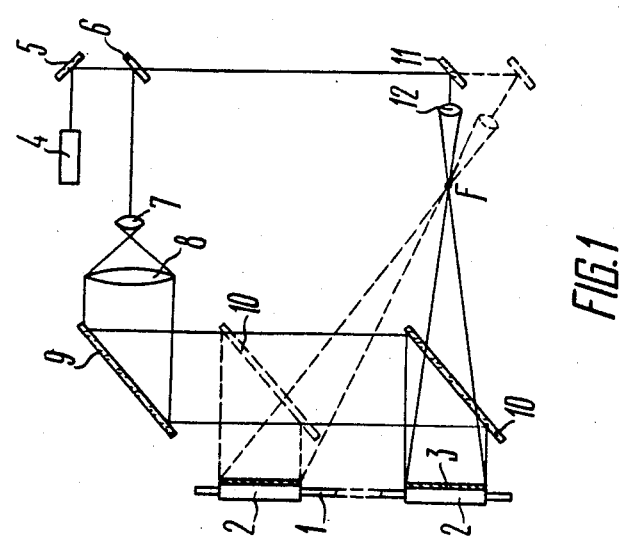

4,682,841

LIGHT RADIATION CONCENTRATOR AND METHOD OF MAKING THE SAME

FIELD OF THE INVENTION

The invention relates to optical engineering, and more particularly it deals with concentrators of light radiation and methods of making the same.

The light radiation concentrator according to the invention may be successfully used in solar energy technology for concentrating solar radiation incident upon the active surface of a photoconverter.

DESCRIPTION OF THE PRIOR ART

Known in the art is a light radiation concentrator made on the basis of Fresnel lens (cf. U.S. Pat. No. 4011857). The Fresnel lens is fabricated by forming, and a special intricately shaped machined die is used for this purpose.

Making such dies is associated with serious manufacturing problems, and Fresnel lenses feature large losses of energy by virtue of reciprocal shading of broken grooves.

Known in the art is a light radiation concentrator in the form of a converging lens which comprises a hologram having its diffraction grating exhibiting focusing properties (cf. R. J. Collier, C. B. Burckhardt, L. H. Lin, Optical Holography, Academic Press, New York, 1971, ch. 2, §42).

This lens is constructed in the form of a transparent plate carrying a light-sensitive layer in which is formed a hologram of a point light source. The hologram is obtained by recording an interference pattern resulting from an interaction of a collimated reference laser radiation and a laser radiation diverging from a point.

The size of the lens is restricted by the optical and mechanical specifications of a holographic apparatus. If the above-described hologram is used as a light radiation concentrator, the power of concentrated radiation at the focal spot is small. In addition, the shape of the focal area and the distribution of energy over the focal plane are determined by the point light source used in preparing the hologram and they cannot be pre-set in advance. This lowers the efficiency of the concentrator if nonround concentrated energy receptors are used and/or if there is the employment of energy receptors which require a pre-set distribution of energy such as rectangular photoconverters.

Known in the art is a facet-type concentrator of light (solar) radiation, comprising a rigid frame having cells in which are secured facets concentrating radiation in the form of biconvex lenses having a common focal area (cf. Coll. High-Temperature Solar-Energy Furnaces, M., Insotrannay Literatura Publ. House, 1960, pp. 210–216).

This prior art concentrator provides high power of the radiation concentrated in the focal spot.

Such a solar energy concentrator is, however, unwieldy in size, while an auxiliary mirror and additional converging lens system, which are required to obtain a common focal area, lead to energy losses and hamper the adjustment of the facet-type solar energy concentrator.

SUMMARY OF THE INVENTION

It is an object of the invention to simplify the structure of a light radiation concentrator.

Another object of the invention is to increase the power of radiation concentrated in the focal spot.

A further object of the invention is to provide for obtaining any shape of the common focal spot of the concentrator.

Still another object of the invention is to provide for a desired distribution of energy of concentrated radiation over the focal plane of the concentrator.

It is also an object of the invention to simplify the process of manufacture of a light radiation concentrator.

These objects are accomplished by a light radiation concentrator comprising a frame and at least two radiation concentrating facets secured therein having a common focal spot. According to the invention, the concentrating facets comprise holograms having their diffraction gratings of a structure which provides a common focal spot.

The parameters of the diffraction gratings of the holograms may be selected in such a manner as to provide a desired shape of the common focal spot.

The parameters of the diffraction gratings of the holograms may also be selected in such a manner as to provide for a desired distribution of energy over the focal plane.

The problem is also solved by a method of making a light radiation concentrator, comprising recording an interference pattern on a light-sensitive object produced by a collimated reference radiation beam and an object beam diverging from the focal spot. According to the invention, the number of the light-sensitive objects used corresponds to the number of the concentrating facets, the objects are rigidly secured in the concentrator frame, and the interference pattern is recorded in a sequence on each light-sensitive object causing the reference beam to displace parallel with itself and by directing the object beam from the focal spot to the respective light-sensitive object.

The object beams are preferably directed by rotating them about the focal spot.

The object beams may also be directed by causing them to pass through a diffuse screen which is placed in the focal plane of the concentrator.

In case it is required to obtain a focal spot of a preset shape, the object beams are caused to pass, after the passage through the diffuse screen, through a diaphragm having an aperture which is shaped in accordance with the shape of the focal area. If it is required to obtain a pre-set distribution of energy oer the focal plane, the object beams are caused to pass, after the passage through the diaphragm, through a light-filter having a distribution of coefficient of transmittance corresponding to the desired distribution of energy over the focal plane of the concentrator.

The light-radiation concentrator according to the invention ensures the collection of light radiation from a large surface (total surface area of all facets) and provides for high power values and desired distribution of energy over the focal plane, while obtaining a desired shape of the focal spot. The concentrator is simple in design, contains a minimum number of components and is reliable in operation.

The method of making a concentrator according to the invention is distinguished from prior art methods designed for similar purposes in that there is no need for a preliminary calculation of parameters of concentrating elements. The method ensures desired optical and geometrical properties of the concentrator in a rather simple manner by providing an appropriate structure of the diffraction grating of a concentrating facet by virtue of a mere application of light waves to a light-sensitive object with a subsequent photochemical treatment of the object. This makes it possible to dispense with the labour-consuming process of making a precision machined model individually for each concentrating facet. In addition, originally prepared concentrating facets in the form of holograms may by reproduced by known duplicating means.

BRIEF DESCRIPTION OF THE DRAWINGS

The invention will now be described with reference to specific embodiments illustrated in the accompanying drawings, in which:

FIG. 1 shows a light radiation concentrator and devices for its manufacture for obtaining transmission holograms; and FIG. 2 shows a light radiation concentrator and devices for its manufacture for obtaining reflection holograms and for providing a desired shape of the focal area and distribution of energy over the focal plane of the concentrator.

DETAILED DESCRIPTION OF THE INVENTION

A concentrator (FIG. 1) consists of a rigid frame 1 having radiation concentrating facets rigidly secured in the frame which are made in the form of plates 2, each having on its surface a light-sensitive object 3 which carries a hologram recorded thereon from a collimated reference radiation beam and an object beam diverging from a focal spot F which is common for all facets.

The structure of the diffraction gratings of all holograms is such that all facets of the concentrator have their common focal area at the point F. This means that the diffraction grating of each hologram of this type exhibits focusing properties, the position of the focal spot F, its shape and distribution of energy over the focal spot being identical with those obtained in recording the interference pattern on the light-sensitive object 3 that is in making the concentrating facet when the hologram is exposed to a light beam which is identical to the reference beam. In one embodiment of the concentrator, holograms may be of the transmission type, similar to converging lenses if the reference beam and the object beam were used to expose the light-sensitive objects 3 on one end the same side in the manufacture of the concentrator. In another embodiment holograms of the reflection type may be used similarly to a concave mirror if the reference beam and the object beam were used to expose the light-sensitive objects 3 on opposite sides in the manufacture of the concentrator. In addition, if the thickness of the recording medium of the light-sensitive objects 3 is chosen to be small compared to the distance between the surfaces of peaks of the interference pattern, the holograms perform as bidimensional diffraction gratings. A bidimensional diffraction grating concentrates the whole white light spectrum, but the light at different wavelengths will diffuse in different manners on such grating and form a focal spot composed of focuses of different colors disposed in a sequence. If the thickness of the recording medium of the light-sensitive objects 3 is chosen to be greater than the distance between the surfaces of peaks of the interference pattern, a three-dimensional diffraction grating is produced which focuses a spectral area which is close to the wavelength of the laser radiation used in the process of manufacture of each concentrating facet.

In all embodiments of the concentrator, parameters of diffraction gratings of concentrating facets may be selected in such a manner as to provide a desired position of the focal spot, its shape and energy distribution over this spot. The desired structure is formed without any special problems automatically in the interference of the reference and object beams. Thus the need for preliminary time-consuming calculations of parameters and focusing properties of the concentrating facet is eliminated.

The equipment for recording holograms on light-sensitive objects 3 of the concentrator comprises a source of coherent monochrome radiation—a laser 4, a rotatable mirror 5 in the path of the laser radiation beam, a beam splitter 6 for splitting the laser beam into two paths, lenses 7 and 8 placed in series in one of the paths of radiation for forming a collimated beam by broadening the beam in this direction, and a mirror 9 for deflecting the beam broadened by the lenses 7 and 8 toward a translucent mirror 10 which, in turn, discrete the collimated beam of coherent radiation toward the light-sensitive object 3. Placed in the other path of the radiation beam is a deflecting mirror 11 and a microobjective 12 for forming a diverging object beam.

The equipment shown in FIG. 2 differs from that shown in FIG. 1 in that the system of mirrors 9 and 10' is disposed behind the concentrator on the side of the plates 2. This results in the two parts of the laser radiation split by the beam splitter 5 exposing the light-sensitive objects 3 on opposite sides. This equipment also includes a diffuse screen 13 and a light-filter 14 with their active surfaces in contact with one another, which are placed behind the microobjective 12 in the path of radiation from the laser 4 so that the plane of contact of the diffuse screen 13 and the light-filter 14 coincides with the desired focal plane of the concentrator.

The distribution of the coefficient of transmittance of the light-filter 14 corresponds to the desired distribution of energy over the focal plane of the concentrator. A diaphargm having an aperture corresponding to the shape of the focal spot of the concentrator may be structurally incorporated in the light-filter 14. The diaphragm 15 may also be made in the form of an individual element placed behind the light-filter 14 in the path of radiation.

The method of making the concentrator resides in the following.

The fraction of the laser beam from the laser 4 deflected from the beam splitter 6 (FIG. 1) is broadened by means of the lenses 7 and 8 to the size of the plate 2 and directed by means of the mirrors 9 and 10 to the surface of one of the light-sensitive objects 3. This collimated beam of laser radiation is the reference beam. At the same time, the second fraction of the laser radiation which passes through the beam splitter 6 is directed by means of the mirror 11, microobjective 12 and the translucent mirror 10 to the same light-sensitive object 3. This beam of laser radiation is the object beam and it takes the form of a cone with the vertex at the point F. The collimated reference beam and the object beam diverging from the point F of the common focal area of the concentrator interfere with one another, act upon the light-sensitive object 3 and build therein a hologram, that is a structure similar to a diffraction grating. After an appropriate photochemical treatment, a hologram of a point-source remains on the plate 2 which exhibits focusing properties. Subsequently the collimated reference beam is caused to move in parallel with itself by means of the translucent mirror 10 and is directed to the next light-sensitive object 3. At the same time, by rotating the microobjective 12 about the common focal spot F the diverging object beam is directed to the same light-sensitive object 3 through the translucent mirror 10. This sequence of operations is repeated for all light-sensitive objects 3 of the concentrator, the number of objects being equal to the number of facets. FIG. 1 shows an example of making facets of a concentrator with transmission holograms, the reference beam and the object beam being directed to the light-sensitive objects 3 on one and the same side.

The equipment shown in FIG. 2 is used for recording reflection holograms. The concentrator having facets in the form of reflection holograms focuses the incident light radiation in the direction opposite to the direction of the incident light.

In making such a concentrator, the collimated reference beam is directed to the facets on the side of the plate 2 and the object beams diverging from the focal spot are again directed to the respective facets on the side of the light-sensitive objects 3. Therefore, in exposing such concentrator to a collimated light beam similar to the reference beam on the side of the light-sensitive objects 3, the light radiation is reflected and concentrated in the focal plane.

In this case the method of making a concentrator resides in the following. A reference beam is formed from the fraction of radiation from the laser 4 deflected by the beam splitter 6, by means of the lenses 7 and 8 and is directed by means of the mirrors 9 and 10' to the light-sensitive object 3 on the side of the plate 2. At the same time the other fraction of radiation from the laser 4, which passes through the beam splitter 6, is reflected from the mirror 11 and directed through the microobjective 12 to the diffuse screen 13. The diffuse screen 13 diffuses this light beam within a large solid angle, thereby directing the object beams simultaneously to all facets, including the object 3 to which the reference beam from the mirror 10' is directed. A diaphragm 15 with an aperture of a predetermined shape or a diaphragm and the light-filter 14 with a pre-set distribution of coefficient of transmittance placed between the diffuse screen 13 and the light-sensitive objects 3 form sources of object radiation beams, that is holographic objects. The image of the diaphragm 15 or diaphragm and the light-filter 14 is recorded in a sequence in all facets of the concentrator by recording on the light-sensitive objects 3 the interference pattern produced by the collimated reference beam and the object beam diverging from the focal area. The collimated reference beam is caused to move parallel with itself as described for the first embodiment and the object beam is directed from the common focal spot of the concentrator.

In carrying out the embodiments of the method of the invention, each facet is fixed, in succession, in the frame 1, exposed to light individually and then subjected to a photochemical treatment and the microobjective 12, diffuse screen 13, diaphragm 15 and light-filter 14 are installed stationary. The use of the microobjective 12 is referred to as an example and is not mandatory. The diffuse screen may be illuminatel to form the object beams, e.g. by using a part of the broadened reference beam. After the interference pattern is recorded on the light-sensitive object 3, the respective facet is removed from the frame 1 of the concentrator, subjected to an appropriate photochemical treatment if required and then re-installed in the frame 1 in exactly the same position as that used during the recording of the interference pattern. The same operation is repeated for all facets. Alternately, each facet with the recorded interference pattern may be covered with an opaque screen after the exposure, and the diffraction grating may be formed on the next facet, with the photochemical treatment being conducted simultaneously for all facets without removing them from the frame 1 of the concentrator.

The interference pattern recorded on each light-sensitive object is similar to a converging lens and represents a hologram of the diaphragm or light-filter, the parameters of the diffraction grating of the hologram containing information on the position of the diaphragm 15 or light-filter 14 with respect to the facet surface, shape of the diaphargm aperture and distribution of coefficient of transmittance of the light-filter 14. In exposing the concentrator to a coolimated beam (such as sun light) the diffraction grating of each facet provides for deflection of the beams toward the common focal spot, the shape of the focal spot being similar to the shape of the diaphargm aperture and the distribution of energy of the concentrated radiation over the focal spot corresponding to the distribution of coefficient of transmittance of the light-filter 14. The focal spot F is disposed with respect to the frame 1 of the concentrator at the same place where the diaphgram 15 or the diaphragm with the light-filter 14 were disposed in preparing the diffraction gratings of the facets. This facility makes it possible to make facets, hence the concentrator, with any predetermined parameters: position of the focal spot with respect to the concentrator surface, shape of the focal spot and distribution of intensity of the concentrated radiation over the focal spot. The concentrator may have any arbitrary shape of the active surface and may be of the transmission type if the radiation is focused behind the active surface of the concentrator or of the reflection type if the concentrated beams are reflected from the facets and concentrated in front of the active surface of the concentrator.

The facet-type concentrator according to the invention makes it possible to use to the greatest advantage the concentrated energy for receptors of various shapes which require a predetermined distribution of the intensity of illumination on their surface and improves the efficiency of light energy conversion. Thus, where it is preferred to use a receptor in the form of a rectangular photoconverter of a predetermined size which has an optimum performance with uniform illumination of the surface, the light-filter may comprise a transparent rectangle, the dimensions of the light-filter and diphragm being equal to the dimensions of the photoconverter. After manufacture the concentrator will have a uniformly illuminated spot in the focal plane which coincides in shape with the photoconverter. This results in an optimum combination of the concentrator with the concentrated light radiation receptor. The selective properties of the holograms with respect to the wavelength of the illuminating light enlarge the capabilites of the concentrator using facets in the form of holograms still farther.

We claim:
1. A method of making a light radiation concentrator consisting of a frame and at least two radiation concentrating facets secured in said frame and comprising holograms, the diffraction gratings of said holograms having a structure enabling the provision of a common focal spot, for a given wavelength of light incident thereon, for all said concentrating facets, comprising the following steps: using recording objects in a number corresponding to the number of said radiation concentrating facets; rigidly securing said recording objects in said frame of the concentrator; recording and developing in a sequence on each of said recording objects an interference pattern produced by a collimated reference beam and an object beam of coherent radiation diverging from said common focal area; causing said reference beam to move transversely while remaining parallel to its original direction between said recordings of the interference pattern and directing said object beam from the common focal spot to said respective recording object; causing said object beam to pass through a diffusing screen placed in the focal plane of the concentrator and causing it to pass after the passage through said diffusing screen through a diaphragm, the shape of the aperture of the diaphragm corresponding to any predetermined shape of said focal spot.

2. A method of making a concentrator according to claim 1, wherein said object beam is caused to pass, after the passage through the diffusing screen, through a light-filter having a distribution of coefficient of transmittance corresponding to a desired distribution of energy over the focal plane of the concentrator.

3. A method of making a concentrator according to claim 1, wherein said object beam is caused to pass, after the passage through the diaphragm, through a light-filter having a distribution of coefficient of transmittance which provides a uniform distribution of energy at the focal plane of the concentrator.

4. A light radiation concentrator comprising:
   a frame;
   a receiver;
   at least two radiation concentrating facets secured to said frame and having holographic diffraction gratings having a structure providing for a common focal spot of all said concentrating facets, said holographic diffraction gratings causing the shape of said common focal spot to correspond to the shape of said receiver.

5. A light radiation concentrator as claimed in claim 4, wherein said holographic diffraction gratings provide a predetermined distribution of energy in said focal spot.

* * * * *